C. Cole.
Pendulum Level.
Nº 17,870.  Patented Jul. 28, 1857.
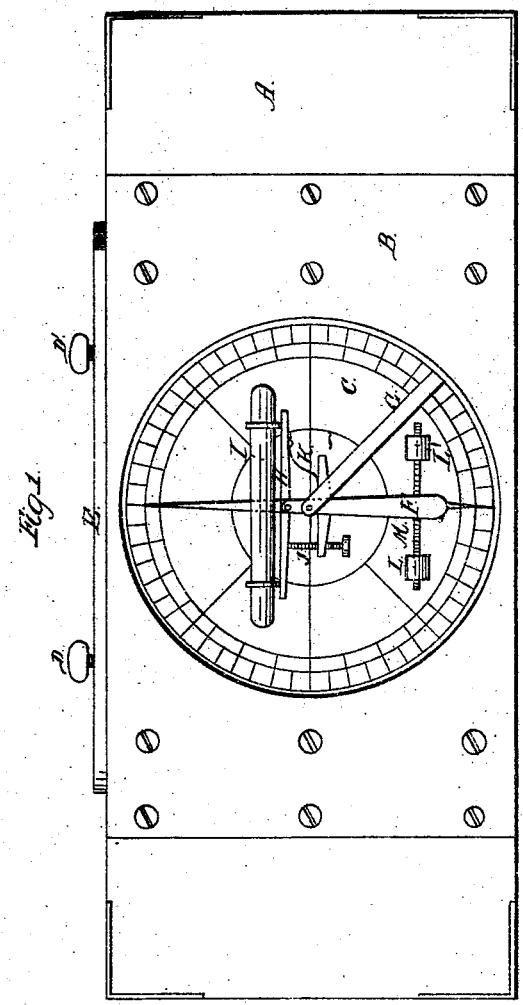
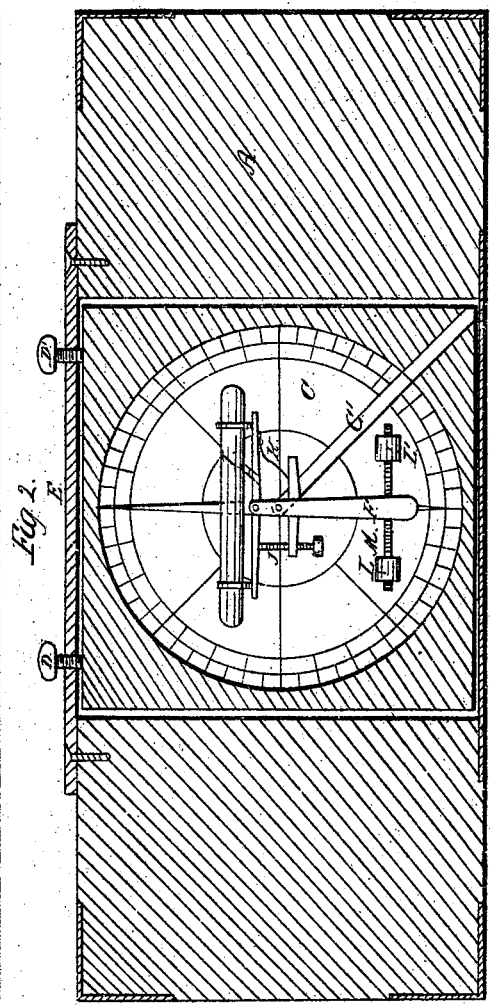
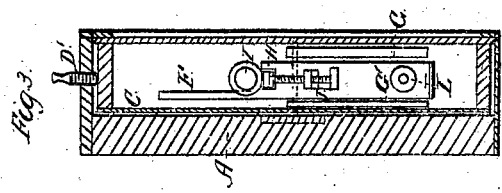
Witnesses.
Sidney Lous
Francis S. Lou
Inventor
Calvin Cole

UNITED STATES PATENT OFFICE.

CALVIN COLE, OF TARRYTOWN, NEW YORK.

ADJUSTMENT APPLIED TO PENDULUM-LEVELS.

Specification of Letters Patent No. 17,870, dated July 28, 1857.

*To all whom it may concern:*

Be it known that I, CALVIN COLE, of Tarrytown, in the county of Westchester and State of New York, have invented certain new and useful Improvements in the Mechanical Implement known as the "Pendulum-Level;" and I do hereby declare that the following is a full and exact description of the same, reference being had to the accompanying drawings and to the letters of reference marked thereon.

The nature of my invention relates to attaching to the pendulum indicator of a pendulum level a spirit level by which the correctness of its indications may not only be verified, but also its position may be adjusted and fixed; and also to other points of improvement by which its correct and reliable operation is rendered more certain.

Figure 1 in the accompanying drawings is an elevation of my improved level complete. Fig. 2 is a vertical longitudinal section through the center of its width; and Fig. 3 is a vertical transverse section through the center of its length.

A is the case or body of the implement, made of any of the materials ordinarily used for the purpose, and protected from wear and injury by metallic corner pieces and facings in the usual manner. In the center of the length of the body is formed an aperture of sufficient size to receive the dial plate and its attachments, which are protected from injury by a heavy glass plate inserted in the metallic plate or cover B. C the dial plate, secured in the aperture in the body, and adjusted to a correct position in relation to the edges of the body by the set screws D, D', working through, and in the plate E. In case it should be required to make use of both edges of the implement, the plate E can be sunk flush with the upper edge, and the set screws D, D', can be made with an ordinary wood-screw head, working in a countersink in the plate, so that they will be out of the way and not interfere with the use of the upper edge. The face of the dial may be divided and marked off into the ordinary number of degrees of a circle, in order that not only a level surface may be indicated by the implement, but also any desired angle, if required. The dial plate is secured at its center coincident to the center of the axis of the pendulum, so that in being adjusted it shall rotate upon that center and the divisions on its face be kept in line with the pendulum. F the pendulum, secured to an axis which works in jeweled apertures in the braces G, G', for the purpose of decreasing its friction and to secure its correct and rapid movement when changed in position. Its lower section is made preponderating in weight, so that it shall always remain downward and so that it will readily adjust the pendulum to a perpendicular position when it is changed from it. It has a pointer or indicator at each of its ends in order that its indication on the dial may be observed equally well at both points.

H is a platform, secured to and vibrating on an axle working in apertures made for the purpose in the body of the pendulum at a short distance above its center, to which is secured and attached the spirit level I, the correct position of the spirit level at right angles to the pendulum being adjusted and secured by the set screw J at one end of the platform and the spring K at the other. By means of this spirit level the exactness of the relative position of the pendulum to it, and the position of the dial to the pendulum is easily attained and the correctness of the implement verified or adjusted. L, L,' counterbalanced weights, with a screw thread cut into them, which are placed and worked upon the screwed rod M, by which the vertical position of the pendulum on its axis is adjusted and regulated.

By the combination and attachment of the spirit level to the pendulum and the arrangement described for the adjustment of the pendulum and dial to its indications, the verification of the correctness of the implement is secured within itself, and the necessity of comparing, adjusting, and verifying it by or with another instrument is avoided, while by the use of the implement not only level surfaces are indicated but also the exact indications of those at any angles, making it of great utility and value to many branches of mechanic art.

I do not claim the use of a pendulum to give indications of level or angular surfaces, nor do I claim the use of a spirit level disconnected from the combination in which I use it, but What I do claim as my invention, and desire to secure by Letters Patent, is—

1. The adjusting platform H with its attached set screw J and spring K as described and for the purposes set forth.

2. The adjustment of the dial plate around the axis of the pendulum by the set screws D, D', as described.

CALVIN COLE.

Witnesses:
SIDNEY LOW,
FRANCIS S. LOW.